May 13, 1930.  H. DICKEHAGE  1,758,562
POTATO DIGGER
Filed Sept. 24, 1927  3 Sheets-Sheet 1
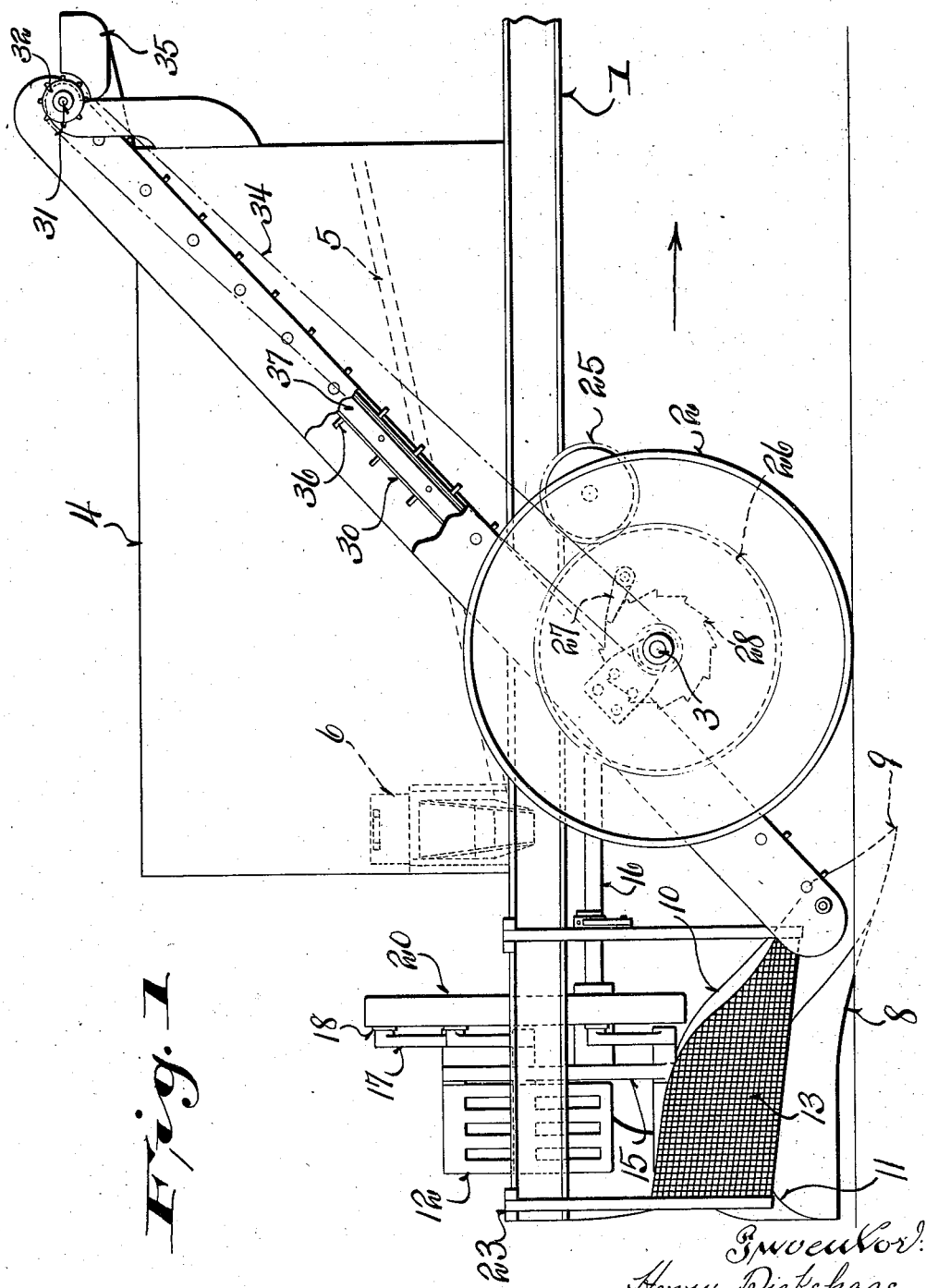

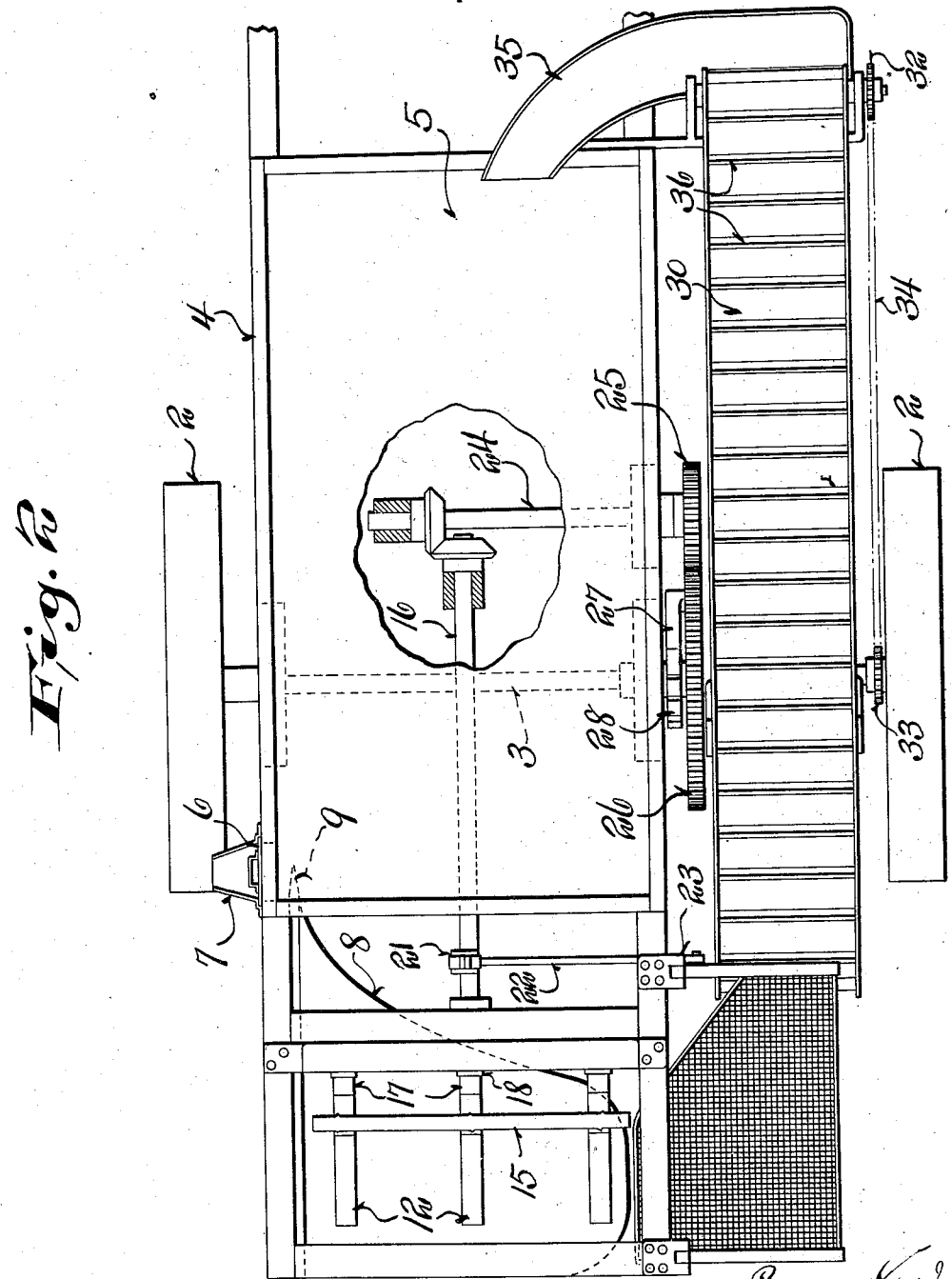

May 13, 1930. H. DICKEHAGE 1,758,562
POTATO DIGGER
Filed Sept. 24, 1927 3 Sheets-Sheet 3
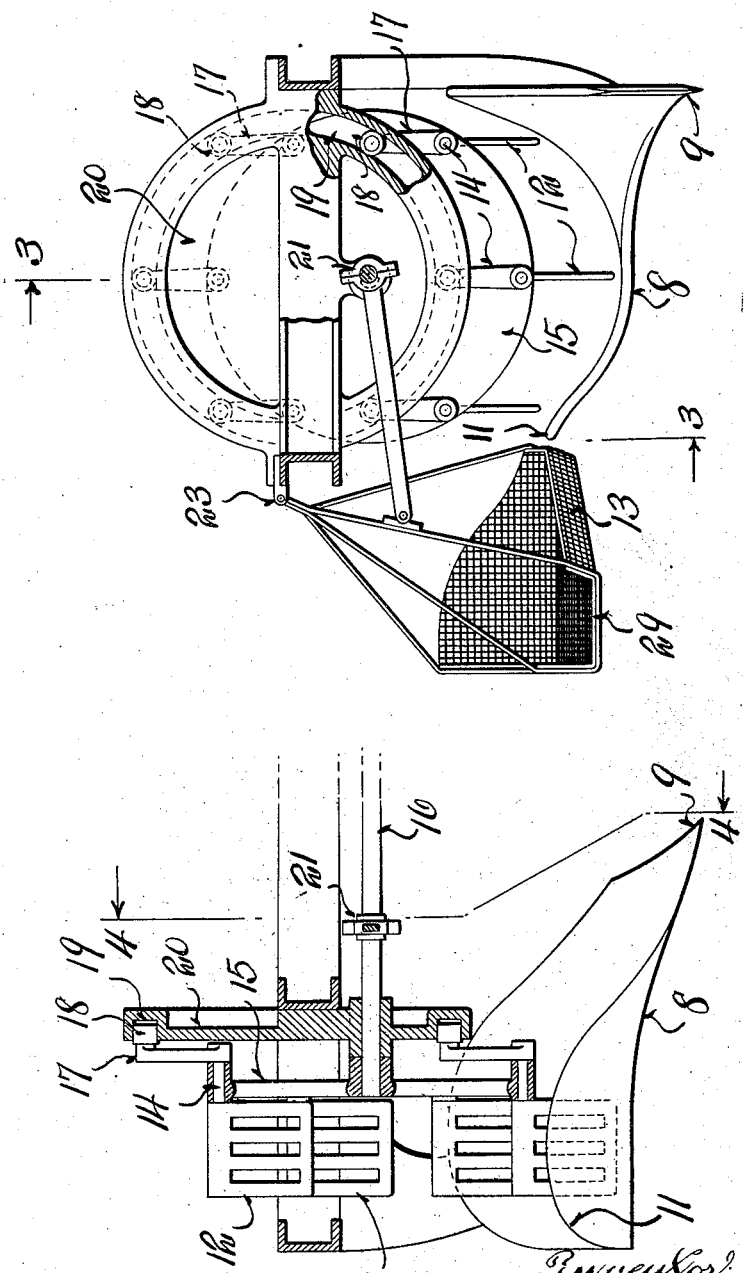

Patented May 13, 1930

1,758,562

UNITED STATES PATENT OFFICE

HENRY DICKEHAGE, OF WEST ALLIS, WISCONSIN

POTATO DIGGER

Application filed September 24, 1927. Serial No. 221,737.

This invention relates to potato diggers.

Objects of this invention are to provide a novel form of potato digger which will dig the potatoes, shake them free of the dirt, elevate and deposit them in a hopper so constructed that the potatoes may be discharged conveniently from single point in the hopper.

Further objects of this invention are to provide a novel form of potato digger in which feathering forks or sweepers cooperate with a curved plow to remove the potatoes from the plow and sweep them into a shaking basket without damaging the potatoes and without wedging them between the sweepers and the plow.

Further objects are to provide a potato digger in which comparatively simple mechanism is employed, in which the parts are sturdy and of reliable construction, and which is so made that the shaking trough and sweepers may be thrown out of operation when desired and will automatically be thrown out of operation upon a reverse direction of travel of the potato digger.

An embodiment of the invention is shown in the accompanying drawings in which:

Figure 1 is a side elevation with parts broken away;

Figure 2 is a plan view with parts broken away;

Figure 3 is a sectional view on the line 3—3 of Figure 4 showing a side view of the plow and the sweepers with parts of the apparatus associated therewith in section;

Figure 4 is a sectional view on the line 4—4 of Figure 3.

Referring to the drawings, it will be seen that the potato digger is carried by a main frame 1 which may be hooked to a tractor or may be drawn by means of horses, or in any other suitable manner. It is supported by means of a pair of rearwardly positioned wheels 2 which are connected by the axle 3. The body portion carries a hopper 4 which is equipped with a slanting bottom 5 which slants downwardly and rearwardly towards one corner thereof, such corner being provided with a sliding door 6 adapted to open or close a discharge opening leading to the discharge chute 7.

The rear of the framework carries a transversely curved plow 8 which is provided with a forward leading point 9 which is located at one corner or end of the plow and at a materially lower level than the remainder of the plow. One side 10 of the plow is relatively high, and the other side 11 is considerably lower, as is particularly shown in Figure 3. This plow is curved, as previously stated, to form a horizontal cylinder portion and a plurality of blades 12 cooperate therewith to sweep the potatoes over the low side of the plow into a shaking basket 13, as may be seen from Figures 3 and 4.

The blades are so constructed that they feather and this is accomplished in any suitable manner, as for example by rigidly connecting the blades to the short shafts 14 (see Figure 3) such shafts being carried or journalled in a rotating spider 15 rigid with the shaft 16. The shafts 14 or trunnions of the sweepers are each provided with an arm 17 equipped with a roller 18. The roller 18 travels in a cam slot 19 formed in a rigidly mounted disc 20 so that as the shaft 16 rotates, the sweepers will be presented downwardly in a vertical position, as shown in Figure 4, and will sweep across the curved or arched portion of the plow, thus sweeping the potatoes into basket 13 without bruising them and without wedging the potatoes between the sweepers and the plow.

It is to be noted further that the shaft 16 carries an eccentric 21 which operates the shaking or oscillating rod 22, the outer end of the rod being pivotally joined to the basket 13. The upper end of the basket is pivoted as indicated at 23 in Figure 4.

The means for driving the shaft 16 may comprise bevel gears connecting the shaft 16 to the transverse jack shaft 24 (see Figure 2). This jack shaft is provided with a gear 25 which meshes with a larger gear 26 loosely mounted upon the axle 3. This large gear 26 is provided with a pawl 27 which cooperates with a ratchet wheel 28 rigidly mounted upon the axle 3, as shown in Figures 1 and 2, so as to drive the gear 26 when the device travels forwardly and to automatically disconnect when the device travels rearwardly.

Further, when the device is being transported to the place where it is to work, the pawl 27 may be manually thrown backwardly or out of engagement with the ratchet wheel, thus preventing operation of the mechanism temporarily.

The basket 13, it will be noted, is provided with an open forward portion 29 which discharges onto an elevating conveyor 30. This elevating conveyor is driven by means of an upper shaft 31 connected to the axle 3 in any suitable manner, as by means of sprocket wheels 32 and 33, and the chain 34 (see Figures 1 and 2). The conveyor elevates the potatoes and discharges them into a downwardly and rearwardly curved chute 35 which discharges into the hopper or main body 4. It may be desirable to provide the conveyor with a plurality of outwardly projecting cleats 36 and also it may be found desirable to guide the conveyor by means of the solid transverse member 37 (see Figure 1) to prevent sagging under weight.

It will be seen that a novel form of potato digger has been provided by this invention which will dig the potatoes, sweep them into a shaking basket, elevate and temporarily store them in a hopper without bruising the potatoes, and with the potatoes substantially freed from adhering dirt.

It is to be noted further that the potato digger is of sturdy and substantial construction and is comparatively simple in design.

Although the invention has been described in considerable detail, such description is intended as illustrative rather than limiting as the invention may be variously embodied and as the scope of such invention is to be determined as claimed.

I claim:

A potato digger comprising a frame, a plurality of wheels for supporting said frame, a plow carried by said frame and having generally a trough-like cross section, said plow having a downwardly extending forward portion adapted to scoop up potatoes and soil and having a horizontally extending cylindrical rear portion into which said forward portion merges, a rotating spider driven from said wheels and having a plurality of feathering blades adapted to enter and sweep across the horizontal cylindrical portion of said plow, and a shaking basket immediately adjacent a lateral edge of the horizontal cylindrical portion of said plow, said blades being relatively wide and the path described by the ends of said blades being approximately of the same curvature as the cylindrical portion of said plow.

In testimony that I claim the foregoing I have hereunto set my hand at West Allis, in the county of Milwaukee and State of Wisconsin.

HENRY DICKEHAGE.